Patented Apr. 5, 1949

2,466,301

UNITED STATES PATENT OFFICE 2,466,301

PLASTICIZING OF SYNTHETIC ELASTOMERS

Joseph P. Haworth, Westfield, and Francis P. Baldwin, Linden, N. J., assignors to Standard Oil Development Company, a corporation of Delaware No Drawing. Application November 21, 1947, Serial No. 787,470

12 Claims. (Cl. 260—30.8)

This invention relates to synthetic rubber-like substances and relates particularly to low temperature olefinic interpolymers which are reactive with sulfur. It relates especially to means for plasticizing high molecular weight interpolymers.

It has been known that mixtures of an iso-olefin or iso-alkene having 4 to 7 carbon atoms such as isobutylene, iso-amylene, 2-methyl pentene or 2-methyl hexene with one or more diolefins or alkadienes such as butadiene, isoprene, piperylene, dimethyl butadiene, and the like, can be interpolymerized at low temperatures ranging from 0° C. or —40° C. to —160° C. by the application thereto of a dissolved Friedel-Crafts catalyst. These polymerization mixtures contain usually from 0.5 to 60 (preferably 2 to 10) weight percent of the diolefins and 99.5 to 40 (preferably 98 to 90) weight percent of the iso-olefins. The resulting polymers have comparatively very high molecular weights, and comparatively low unsaturation, e. g. about 0.3 to 5 mol percent as determined by the ozonolytic method described by Rehner and Gray in Industrial and Engineering Chemistry, Anal. Ed., vol. 17, pp. 367–370 (1945), to which reference is made hereby for details. They are reactive with sulfur in a curing reaction which has some points of similarity to the vulcanization of rubber, and yield extremely valuable rubber-like synthetic bodies.

However, difficulty has been encountered in the milling and processing of many of these polymers, especially those of very high molecular weight. The polymers of moderately high molecular weights are readily milled, cure readily and yield good rubber-like bodies but they do not have the maximum in tensile strength. Polymers having very high molecular weights yield cured bodies having exceedingly good tensile strength, elongation, abrasion resistance, flexure resistance and other valuable properties, but they are so tough that they are extremely difficult to mill, calender and extrude.

It has been now discovered that, providing that these iso-olefin-polyolefinic copolymers have an unsaturation of at least about 0.5 mol percent as determined by ozonolysis, processing characteristics of even the toughest of these co-polymers may be improved through the use of aryl mercaptans as plasticizing agents, with minimum sacrifices in the desirable physical properties of cured vulcanizate subsequently obtained.

Thus the process of the invention plasticizes high molecular weight olefinic copolymers of a certain minimum unsaturation to permit them to be processed as readily as polymers of lower molecular weights, while retaining to a large degree the high tensile strength and other valuable properties characteristic of the products of higher molecular weights. The product of the invention likewise is a rubber-like polymer which is readily processed before curing, and shows an unusually high tensile strength and other valuable properties after curing. Other objects and details of the invention will be apparent from the following description.

In practicing the invention, the polymeric material is usually prepared from a mixture of 98 to 40 weight percent of an iso-olefin which is preferably isobutylene, but may be other iso-olefins such as 2-ethyl butene-1 or 2-methyl pentene-1, or the like; together with 2 to 60 weight percent of a polyolefin such as butadiene or isoprene or piperylene, or dimethyl butadiene, or myrcene, or dimethallyl, or the like, diolefins having from 4 to 6 carbon atoms per molecule being preferred. The polymerizable olefinic material is internally or externally cooled to temperatures ranging from 0° C. to —164° C., convenient temperatures being —78° C. or —127° C., and the polymerization is conducted by the application to the cold olefinic mixture of a Friedel-Crafts catalyst dissolved in an organic solvent which does not form a complex with the catalyst and which is liquid at the polymerization temperature.

The Friedel-Crafts catalyst may be aluminum chloride, aluminum bromide, boron fluoride, double salts ranging in composition from aluminum dichloro bromide to dialuminum pentabromo chloride, aluminum bromide-aluminyl bromide, titanium tetrachloride, titanium chloroacetate and other known active Friedel-Crafts halogen compounds or their equivalents. Also many of these catalysts may be used in the form of complexes such as aluminum alkoxide-aluminum chloride, or complexes of active Friedel-Crafts halides with ethers or with aromatic compounds.

For the solvent, substantially any of the lower mono- or polyhalogenated alkanes having freezing points below about —10° C., as well as carbon disulfide, may be used. Methyl chloride, ethyl chloride and the like are particularly useful.

In carrying out the known polymerization, the Friedel-Crafts catalyst is dissolved in the solvent and mixed with the cold olefinic mixture of polymerizable monomers, the olefinic mixture usually being diluted by about 1 to 3 volumes of an inert diluent per volume of polymerizable material. Suitable diluents include methyl chloride, ethyl chloride, ethane, ethylene, propane and the like. It is preferred to carry out the addition of catalyst solution in the form of a fine dispersion mixture which is sprayed into the vigorously stirred olefinic mixture. The polymerization thereupon proceeds rapidly to yield a solid rubbery polymer having a relatively high molecular weight. Further details of such a polymerization are described in U. S. Patent 2,356,128.

After the completion of the polymerization reaction, the solid polymer is separated in a known manner from the liquid residue of the reaction mixture and brought up to room temperature. It is conveniently washed and purified on a mill to remove traces of catalyst and residual amounts of unpolymerized material, and it is then ready for compounding.

According to well-known recipes the polymers may be mixed with sulfur, with vulcanization accelerators such as tetramethyl thiuram disulfide or the like, and with addition agents such as carbon black, zinc oxide, stearic acid and the like. The compounded polymers may then be cured at temperatures ranging from room temperature up to about 189° C. for time intervals ranging from hours to a few minutes, depending upon the particular compounding formula and upon the curing temperature used. The resulting cured materials have excellent tensile strengths ranging from 2500 to 4600 pounds per square inch, elongations at break ranging from 700% to 1200%, and are highly impermeable to gases, thereby being especially suited for the manufacture of inner tubes and other rubber articles. However, the low-temperature polymerization frequently proceeds at such a rapid rate that it becomes very difficult to control the molecular weight of the resulting polymer, and thus very often polymers of undesirably high molecular weight are produced which have generally excellent properties but are extremely tough, thereby being unsuited or uneconomical for use in manufacturing operations which require mechanical working of the polymer.

The toughness (which is a measure of the molecular weight) of these polymers is conveniently evaluated in terms of their Mooney viscosity. The procedure for determining such viscosities is described in detail in Industrial and Engineering Chemistry, Analytical Edition, vol. 6, page 147 (1934). Polymers having Mooney viscosity values in excess of about 50 or 60 are considered unduly tough for many customary processing operations and accordingly do not meet specifications set by the government for standard GR-I rubber, under which generic name the rubbery low-temperature copolymers of isobutylene and diolefin have become known in the art.

Another useful method for determining the toughness or plasticity of the polymers is described by Williams in Industrial and Engineering Chemistry, volume 16, page 362 (1924). In this test two useful values are determined, namely (1) the plasticity number which represents the final thickness of a spherical sample of polymer of 2 cc. volume after compression between two parallel plates for three minutes under a load of 5 kg., and (2) the recovery value which is the increase in thickness of the deformed sample on being allowed to cool for one minute at room temperature.

It has been now discovered that GR-I type iso-olefin-polyolefinic copolymers having preferably a minimum unsaturation of at least about 0.7 mol percent, including those having undesirably high viscosities, can be effectively softened by means of surprisingly small amounts of aryl mercaptans, especially the mono-cyclic or dicyclic aryl mercaptans having 8 to 10 carbon atoms per molecule and having the mercaptan sulfur atom attached to an aromatic carbon. Useful examples of these include xylyl mercaptans, alpha naphthyl mercaptan and beta naphthyl mercaptan and mixtures thereof. Salts thereof such as the zinc or calcium salts of xylyl mercaptans have also been found to be similarly effective. Of the group mentioned, xylyl mercaptans, alpha naphthyl mercaptan and beta naphthyl mercaptan are particularly preferred. These and other mercaptan compounds can be used with great advantage when they are added to the polymer in liquid form, e. g. in the form of a commercial solution of 33⅓% of beta naphthyl mercaptan in mineral oil (RPA #2), solutions of 36½% of xylyl mercaptan in mineral oil (RPA #3) or an oily mixture of aryl mercaptan standardized as 50% alpha naphthyl mercaptan (RPA #4).

According to the present invention, when the olefinic material has been polymerized to form a GR-I type elastomer, warmed up to room temperature and thoroughly dried of volatile ingredients, it is compounded with 0.05 to 1.0 weight percent of an aryl mercaptan softening agent and mechanically masticated at an elevated temperature ranging between 200 and 350° F., preferably between 250 and 300° F. The time required for such plasticizing treatment, especially where 0.1 to 1.0 weight percent of aryl mercaptan is used, may range from 2 to 20 minutes, usually 5 to 15 minutes being sufficient to plasticize even a very tough polymer having a Mooney viscosity of 80 to yield a product having a Mooney viscosity of the preferred value of below 50. The presence of the aryl mercaptan thus was found to be unusually effective in reducing the power consumed by the compounding mill, causes "banding" on the rolls in a much shorter time, facilitates calendering and extrusion, and in general greatly simplifies the processing treatment and improves the workability of the copolymer.

Alternatively, where it is desired to reduce GR-I type polymers to a liquid or syrupy consistency for use as rubber cements, adhesives or oil thickeners, 1 to 12 weight percent of the aryl mercaptans should be added depending on the original plasticity of the polymer and the eventual fluidity required.

In connection with natural rubber, it has been known heretofore that aryl mercaptans were useful plasticizers, but no more effective than other well-known plasticizing agents, e. g., mercaptobenzothiazole. On the other hand, in conjunction with synthetic elastomers such as polydisulfide rubber or with emulsion polymers known under the generic names of GR-S (diolefin-styrene) or GR-A (diolefin-acrylonitrile) the plasticizing effectiveness of aryl mercaptans has been found completely unsatisfactory. Thus, for instance, British Patent 520,505 describes that beta naphthyl mercaptan by itself produces no appreciable softening of polydisulfide rubber. Similarly, the trade publication "Du Pont Rubber Chemicals," February 1943, page 110, states that beta naphthyl mercaptan softens GR-S elastomers only slightly. Indeed, even in the case of GR-I type elastomers aryl mercaptans have been found ineffective as plasticizers. For instance, in the case of a GR-I elastomer having an unsaturation of 0.3 mol per cent and prepared by polymerizing 100 parts by weight of isobutylene with 10 parts by weight of butadiene in the usual manner described hereinabove, only a barely noticeable softening of the elastomer could be observed after milling for 15 minutes at 300° F. with 0.18 weight percent of xylyl mercaptan. Similarly, no softening was observed under the same conditions in the case of high molecular weight polyisobutylene.

Now, in direct contrast to these negative teachings of the art, it has been discovered not only that aryl mercaptans exert a plasticizing effect on GR-I type elastomers for which no practical plasticizing agent was previously known, but actually it was found that very small amounts of aryl mercaptans, e. g., between 0.1 and 1.0 weight percent based on elastomer, are sufficient to cause a rapid and substantial decrease of viscosity without noticeably retarding the cure and without causing a detrimental increase in low molecular weight polymer which undesirable phenomena are often encountered in other methods of polymer breakdown. However, it has been discovered further that such plasticization of GR-I type elastomers is possible only when the elastomer has an unsaturation of at least about 0.5 mol percent, which figure appears to be critical and which thus explains the failure of aryl mercaptans to plasticize the highly saturated GR-I elastomer mentioned above.

The following specific examples, wherein our invention is compared with known plasticizing methods, illustrate our new method still further. It will be understood, of course, that it is not intended to limit the invention thereto in any manner, but on the contrary still other embodiments or modifications of the invention will readily be thought of by those skilled in the art.

EXAMPLE I

A mixture was prepared consisting of 95 parts by weight of liquid isobutylene of about 98.5% purity, and 5 parts by weight of isoprene of about 96% purity. This mixture was cooled to a temperature of about −100° C. by the presence in the mixture of approximately 300 parts of liquid ethylene per 100 parts of mixed reactants and it was polymerized by the addition to the cold reactant mixture of approximately 10 parts of catalyst solution containing approximately 0.9 weight percent of aluminum chloride dissolved in ethyl chloride. The resulting polymer was found to have a molecular weight of approximately 1,000,000 (a Staudinger number of about 75,000), an iodine number of approximately 1.5, 1.2 mol percent unsaturation by ozonolysis and a Mooney viscosity of 70.

Samples of this polymer were masticated in a known manner for periods of 3, 5 and 10 minutes in a high speed Banbury mixer at temperatures exceeding 500° F. and found to have the following properties:

|  | After Banburying for— | | |
|---|---|---|---|
|  | 3 min. | 5 min. | 10 min. |
| Mooney viscosity at 212° F | 57 | 29 | 26 |
| Williams plasticity at 70° F., 5 Kg | 134 | 80 | 80 |
| Williams Recovery | 14 | 4 | 7 |

The polymer samples thus plasticized were compounded and cured according to the following recipe:

|  | Parts by weight |
|---|---|
| Polymer | 100.0 |
| Zinc oxide | 5.0 |
| Stearic acid | 3.0 |
| Sulfur | 1.5 |
| Easy processing channel black | 10.0 |
| Tetramethyl thiuram disulfide | 1.0 |

The following results were then obtained on the tensile strength and elongation of the vulcanized samples after curing for the indicated time.

TABLE I

|  | Polymer plasticized for— | | | | | |
|---|---|---|---|---|---|---|
| After | 3 min. | | 5 min. | | 10 min. | |
|  | T. S.[1] | EL.[2] | T. S.[1] | EL.[2] | T. S.[1] | EL.[2] |
| 20′ cure | 2,412 | 960 | no cure | | no cure | |
| 40′ cure | 2,790 | 860 | 1,723 | 930 | 1,133 | 922 |
| 60′ cure | 2,930 | 850 | 1,913 | 896 | 1,678 | 930 |

[1] Tensile strength in pounds per square inch.
[2] Elongation in percent.

The above data indicate that under severe conditions purely mechanical plasticization is possible as evidenced by a Mooney viscosity of 57 after three minutes in the Banbury mixer, 29 after five minutes and 26 after ten minutes as compared with an original Mooney viscosity of 70. However, the foregoing data also make it abundantly clear that the purely mechanical plasticization brings about a substantial reduction of tensile strength of the resulting vulcanizates, and some cure retardation was also observed. Furthermore, such mechanical plasticization is disadvantageous because it must be carried out at high temperatures and requires special equipment. According to the present invention these disadvantages can be reduced to a minimum by employing small amounts of aryl mercaptans as plasticizers. The subsequent examples illustrate the unexpected effectiveness of this new method.

EXAMPLE 2

A polymer was prepared as in Example 1 from a reactant feed consisting of 97.5 weight percent of isobutylene and 2.5 weight percent of isoprene. Samples of this polymer, which had an unsaturation of 0.8 mol percent, were milled for ten minutes at 300° F. on an open mill together with one weight percent of various aryl mercaptans and the Mooney viscosity of the milled samples was compared with the viscosity of a sample also milled for ten minutes at 300° F. but in the absence of any plasticizer. The results obtained are summarized below in Table II.

TABLE II

| Mercaptan | Mooney Viscosity |
|---|---|
| None | 80 |
| Xylyl mercaptan | 24 |
| alpha-naphthyl mercaptan | 20 |
| beta-naphthyl mercaptan | 19 |

These results show that even at temperatures substantially below those necessary for purely mechanical plasticization, one weight percent of any one of the aryl mercaptans used was more than enough to reduce the Mooney viscosity of the polymer well below 55, which value is generally considered by the rubber industry as representing the maximum tolerable limit for polymer toughness when such polymers are to be processed in existing rubber machinery.

EXAMPLE 3

To further illustrate the effectiveness of aryl mercaptans as plasticizers, samples of isobutylene-isoprene polymers having an unsaturation of 0.8 mol percent and having various original viscosities but otherwise prepared in the manner described in Example 2, were masticated for ten minutes with varying concentrations of beta-naphthyl mercaptan on an open mill at various temperatures. At the end of this treatment the Mooney viscosity of each sample was determined at 212° F. The results obtained are summarized in Table III below.

TABLE III

| Original Mooney Viscosity at 212° F. | Mercaptan Conc. (per cent by weight) | Mooney Viscosity at 212° F. after mastication at— | | |
|---|---|---|---|---|
| | | 200° F. | 250° F. | 300° F. |
| 80 | 0.1 | 69 | 66 | 67 |
| 80 | 0.2 | 59 | 48 | 49 |
| 80 | 0.3 | 54 | 40 | 40 |
| 80 | 0.4 | 50 | 35 | 35 |
| 80 | 0.5 | 48 | 32 | 32 |
| 75 | 0.05 | -------- | -------- | 65 |
| 75 | 0.1 | -------- | -------- | 57 |
| 75 | 0.2 | -------- | -------- | 45 |
| 75 | 0.3 | -------- | -------- | 37 |
| 75 | 0.5 | -------- | -------- | 28 |
| 75 | 0.75 | -------- | -------- | 19 |
| 75 | 1.0 | -------- | -------- | 18 |
| 70 | 0.1 | 62 | 56 | 50 |
| 70 | 0.2 | 51 | 42 | 38 |
| 70 | 0.3 | 46 | 35 | 33 |
| 70 | 0.4 | 43 | 30 | 30 |
| 70 | 0.5 | 41 | 28 | 27 |
| 60 | 0.05 | 51 | 51 | 49 |
| 60 | 0.1 | 45 | 44 | 41 |
| 60 | 0.2 | 40 | 33 | 31 |
| 60 | 0.3 | 37 | 28 | 26 |
| 60 | 0.4 | 35 | 25 | 23 |
| 60 | 0.5 | 33 | 22 | 21 |
| 50 | 0.1 | 42 | 37 | 36 |
| 50 | 0.2 | 37 | 28 | 25 |
| 50 | 0.3 | 34 | 24 | 20 |
| 50 | 0.4 | 32 | 21 | 17 |
| 50 | 0.5 | 31 | 19 | 15 |

The plasticizing effect of the zinc salt of xylyl mercaptan (xylyl-S)$_2$Zn, xylyl mercaptan, alpha-naphthyl mercaptan ($\alpha$—C$_{10}$H$_7$.SH) and beta-naphthyl mercaptan ($\beta$—C$_{10}$H$_7$.SH) was further investigated in a Banbury mixer in connection with the GR-I copolymer prepared in Example 2 which copolymer had an original Mooney viscosity of 74 and an unsaturation of 0.8. Each treatment was carried on for 15 minutes at 300° F. The results are shown in Table III-A:

TABLE III-A

| Mercaptan Concentration (Wt. per cent) | Mooney Viscosity after treatment with— | | | |
|---|---|---|---|---|
| | (xylyl-S)$_2$.Zn | Xylyl-SH | -C$_{10}$H$_7$-SH | -C$_{10}$H$_7$-SH |
| 0.05 | 69 | 62 | 60 | 59 |
| 0.1 | 62 | 52 | 47 | 48 |
| 0.17 | 52 | 40 | 35 | 24 |
| 0.25 | 42 | 24 | Too low to measure | |
| 0.33 | 33 | Too low to measure | | |
| 0.5 | 24 | Too low to measure | | |

The results of Tables III and III-A show clearly the effectiveness of aryl mercaptans for plasticizing GR-I type elastomers. It is particularly significant to note that amounts of about 0.1 to 0.5 weight percent of aryl mercaptan plasticizer are sufficient to reduce even the toughest polymer examined (80 Mooney) to a sufficiently plastic condition for processing in customary machinery.

Furthermore, a comparison of the results of Table III-A with the results relating to the comparable 75-Mooney polymer in Table III shows that a larger amount of mercaptan must be added for plasticizing in an open mill than in closed equipment, such as a Banbury mixer. Thus, for instance, where more than 0.5% of beta-naphthyl mercaptan (or 1% of xylyl mercaptan) must be added in an open mill in order to reduce the Mooney viscosity of a polymer from 75 to 24, in a Banbury a mere 0.17% of beta naphthyl or 0.25% of xylyl mercaptan is sufficient to effect the same reduction of viscosity. Hence it appears that in closed equipment the entire amount of mercaptan added is fully effective in the plasticization, whereas on an open mill only about one-quarter to one-third of the amount of mercaptan added is actually effective in bringing about the plasticization and the rest is lost without effect, by volatilization or otherwise. Accordingly, the general plasticizing effect of aryl mercaptans may be described in terms of "effective amount" which is equal to the "amount added" in cases where closed equipment is used, but which equals only a fraction of the "amount added" in cases where open equipment is used.

EXAMPLE 4

An elastomer was prepared in the same manner as described in Example 2. The resulting elastomer, which had an unsaturation of 0.8 mol percent and a Mooney viscosity of 78 at 212° F. was employed to study the effect of mastication temperature on the plasticizing action of aryl mercaptans in a Banbury mixer. Samples of the elastomer were introduced into the mixer together with 0.5 weight percent (based on elastomer) of a solution of xylyl mercaptan in mineral oil, the amount of solution added containing 0.18 weight percent (based on elastomer) of pure xylyl mercaptan. The mixture of elastomer and mercaptan solution was then masticated for ten minutes at various temperatures, the results obtained being summarized in Table IV.

TABLE IV

| Temperature, °F | Mooney Viscosity at 212° F. |
|---|---|
| 175 | 78 |
| 190 | 76 |
| 200 | 71 |
| 215 | 63 |
| 240 | 50 |
| 250 | 48 |
| 260 | 48 |
| 300 | 48 |
| 300 (no mercaptan added) | 78 |

A similar polymer as just described, having an original Mooney viscosity of 76, was used also for determining the effect of mastication temperature on the plasticizing action of aryl mercaptans on an open mill. In this particular series of runs 1 weight per cent of beta naphthyl mercaptan was added to the elastomer stock on the mill whereafter the mixture of elastomer and mercaptan was masticated for ten minutes at several different temperatures. The results obtained are summarized in Table V.

TABLE V

| Mercaptan Conc. (weight (per cent) | Temperature, °F. | Mooney Viscosity at 212° F. |
|---|---|---|
| 0 | 100 | 76 |
| 1.0 | 100 | 53 |
| 1.0 | 150 | 47 |
| 1.0 | 200 | 18 |
| 1.0 | 250 | 18 |
| 1.0 | 300 | 18 |
| 0 | 300 | 76 |

The results shown in Tables IV and V clearly indicate that temperatures as high as 300° F. cause no appreciable breakdown of the elastomer in the absence of mercaptan plasticizer. On the other hand, the results show also that in the presence of mercaptan plasticizers, the mastication temperature has an important effect on breakdown. In particular, Table IV indicates that under the conditions used, a Banbury temperature between 200 and 300° F. is especially effective, while still further increases in temperature appear to be of no additional benefit to the effectiveness of the mercaptans. Similarly, under the conditions prevailing in the runs summarized in Table V, it is apparent that temperatures as low as 100° to 200° F. are sufficient to carry out the plasticization in the presence of the aryl mercaptans. The fact that the temperature effect levels off at a lower temperature under the conditions obtained in the runs of Table V than in those of Table IV must be ascribed to the greater mercaptan concentration in the former rather than to any difference between the action of a Banbury on one hand and a open mill on the other hand. On the contrary, under comparable conditions the mastication in a Banbury mixer is more effective than on an open mill, as was shown in Example 3.

EXAMPLE 5

The time of treatment also has a definite effect on the efficiency of mercaptan plasticization as will be apparent from the following.

A GR-I type copolymer of isobutylene and isoprene prepared as in Example 2 having an unsaturation of about 0.8 mol percent and an original Mooney viscosity of 67, was mixed for varying lengths of time in a Banbury at 300° F. in the presence of 0.4 weight percent of a 36.5% solution of xylyl mercaptain in inert mineral oil (equals 0.146% of xylyl mercaptan per weight of polymer). The results shown in Table VI were obtained, indicating that a Banbury treatment lasting for about 2 to 10 minutes is all that is required to reduce the Mooney viscosity within the range preferred for fabrication.

TABLE VI

| Time of Treatment (Minutes) | Mooney Viscosity (at 212° F.) |
|---|---|
| 0 | 67 |
| 2 | 58 |
| 4 | 53 |
| 6 | 51 |
| 8 | 49 |
| 10 | 48 |
| 15 | 48 |

A similar series of tests carried out at 300° F. in an open mill in the presence of 0.2 weight percent of betanaphthyl mercaptan per weight of polymer (original Mooney viscosity of 78) yielded the results summarized in the following table.

TABLE VII

| Time of Treatment (Minutes) | Mooney Viscosity (at 212° F.) |
|---|---|
| 0 | 78 |
| 1 | 68 |
| 3 | 55 |
| 5 | 49 |
| 10 | 44 |
| 20 | 41 |

These results, much like those shown in Table VI, again show that a mastication of about three to ten minutes is entirely sufficient to bring about the necessary plasticization.

EXAMPLE 6

To illustrate the unexpected effectiveness of aryl mercaptans as plasticizers for GR-I type elastomers their action was compared with that of mercaptobenzothiazole which is well known to be an excellent plasticizer for natural rubber. In the comparative tests, a GR-I (isobutylene-isoprene) copolymer prepared as in Example 2, having an unsaturation of 0.8 mol percent and an original Mooney viscosity of 62 was milled in an open mill for 15 minutes at 300° F. in the presence of 0.5% of mercaptobenzothiazole, thereby reducing the Mooney viscosity of the polymer from the original value of 62 to 54, i. e. by about 13%. On the other hand, when the same polymer was milled under the same conditions in the presence of 0.2% of xylyl mercaptan, the Mooney viscosity was reduced from 62 to 41 (about 34% decrease), and when 0.5% of xylyl mercaptan was used, the Mooney viscosity was reduced from 62 to 32, i. e. by almost 50%.

This severe reduction of viscosity is particularly significant because heretofore no comparably effective plasticizers were known for GR-I type polymers. Prior to the discovery described herein, the art had no economical method for intensively plasticizing undesirably tough GR-I type polymers, e. g. those having a Mooney viscosity of about 60 or more, to make such polymers suitable for processing in existing machinery, for which a viscosity of about 50 Mooney is generally considered to be the practical upper limit.

EXAMPLE 7

The plasticizing effect of aryl mercaptans is equally strong in the case of GR-I type copolymers of relatively high unsaturation.

A reactant mixture containing 100 parts by weight of isobutylene and 120 parts by weight of butadiene was diluted with 200 parts by weight of methyl chloride and externally cooled to —98° C. The polymerization was carried out at this temperature by adding to the cold mixture a 1% solution of aluminum chloride in methyl chloride. The resulting polymer was recovered in a known manner and was found to have an unsaturation of 3.42 mol percent (by ozonolysis), a Staudinger molecular weight of 45,400 and a Mooney viscosity of 53. This polymer was mixed on an open mill with 0.15 weight percent of xylyl mercaptan (added in the form of a 36.5% solution in mineral oil) and the milling was continued for ten minutes at 300° F. The thusly treated polymer was found to have a final Mooney viscosity of 23.

EXAMPLE 8

One hundred pounds of a tough isobutylene-isoprene copolymer, prepared as in Example 2, and having an unsaturation of about 0.8 mol percent and an original Mooney viscosity of 82, were mixed with 0.5 pound of a plasticizer solution consisting of 36.5 weight percent of xylyl mercaptan and 63.5 weight percent of inert mineral oil, and the resulting mixture of copolymer and plasticizing solution was Banburied for ten minutes at 300° F. The Mooney viscosity of the copolymer after this treatment was found to be 48 and the Williams plasticity-recovery was 112–10, comparing favorably with regular government specifications of GR-I rubber. This plasticized polymer was then used to determine possible degradation in tube, carcass and tread stocks. Comparison was made with a stock synthesized directly to government specifications, i. e. having an original Mooney viscosity of 40 to 50. This latter stock was likewise obtained by reacting 2.5% of isoprene with 97.5% of isobutylene as in Example 2. The results are shown in the following tables.

TABLE VIII
Effect of mercaptan on GR-I tube stock

|  | Polymer synthesized directly to government specifications | Polymer plasticized with mercaptan [1] |
|---|---|---|
| Amount of Polymer | 100.0 | 100.0 |
| Zinc Oxide | 5.0 | 5.0 |
| Stearic Acid | 3.0 | 3.0 |
| Tetramethylthiuram disulfide | 1.0 | 1.0 |
| Mercaptobenzothiazole | .5 | .5 |
| Sulfur | 1.5 | 1.5 |
| Semi-reinforcing Furnace Black | 50.0 | 50.0 |
| Mooney @ 212° F. after compounding | 66 | 66 |
| Williams Plasticity—Recovery at 70° C., 5 Kg. after compounding | 138–14 | 135–11 |

TENSILE—MOD. AT 300%—MOD. AT 500%—ELONGATION AT ROOM TEMPERATURE

|  |  |  |
|---|---|---|
| Cure 15' at 307° F | 1852-39-633-793 | 1793-293-691-793 |
| Cure 30' at 307° F | 1780-503-1015-687 | 2100-457-1077-737 |
| Cure 60' at 307° F | 1650-571-1162-643 | 1970-556-1270-667 |
| Cure 120' at 307° F | 1540-626-1228-607 | 1702-576-1278-633 |

TENSILE—MOD. AT 300%—ELONGATION AT 100° C.

|  |  |  |
|---|---|---|
|  | 406-58-926 | 415-63-947 |
|  | 380-180-607 | 305-183-517 |
|  | 340-245-423 | 239-258-353 |
|  | 272-239-333 | 236-232-297 |

TENSILE—MOD. AT 300%—MOD. AT 500%—ELONGATION, AGED 48 HRS. AT 250° F. IN AIR OVEN

|  |  |  |
|---|---|---|
| Cure 15' at 307° F | 1448-660-1158-600 | 1508-609-1200-600 |
| Cure 30' at 307° F | 1360-711-1207-553 | 1605-657-1285-600 |
| Cure 60' at 307° F | 1300-711-1225-523 | 1255-643-1243-603 |
| Cure 120' at 307° F | 1362-660-1165-590 | 1327-588-1197-623 |
| Crescent Tear at Room Temperature: |  |  |
|   Cure 15' at 307° F | 246 | 273 |
|   Cure 30' at 307° F | 204 | 214 |
|   Cure 60' at 307° F | 142 | 154 |
|   Cure 120' at 307° F | 192 | 144 |
| Crescent Tear at 100° C.: |  |  |
|   Cure 15' at 307° F | 58 | 60 |
|   Cure 30' at 307° F | 50 | 62 |
|   Cure 60' at 307° F | 53 | 28 |
|   Cure 120' at 307° F | 51 | 14 |
| Compression Set 30% ASTM Constant Deflection, 22 hours at 70° C.: |  |  |
|   Cure 25' at 307° F | 44.5 | 41.8 |
|   Cure 40' at 307° F | 45.0 | 31.8 |
|   Cure 70' at 307° F | 31.9 | 28.1 |
|   Cure 120' at 307° F | 25.2 | 22.3 |
| Extrusion: |  |  |
|   Length | 68" | 80" |
|   Weight | 154 gr | 155 gr |
|   Appearance | very smooth | smooth |
|   Remarks |  | low swell |
| Calenderability: Hot fresh from calender: |  |  |
|   Rate | 30¼" | 27¼" |
|   Width | 6¾" | 6⅜" |
|   Gauge | .019 | .020 |
|   Appearance | smooth | smooth |
| Calenderability: After resting 30': |  |  |
|   Length | 29¼" | 27" |
|   Width | 6⅝" | 6⅜" |
|   Gauge | .024 | .025 |
|   Appearance | smooth | smooth |
| Hot Flow at 250° F.: |  |  |
|   Load, lbs./sq. in | 68 | 64 |
|   15' cure at 307° F.: |  |  |
|     Total Elong.: |  |  |
|       1 hr | 159 | 178 |
|       3 hrs | 266 | 320 |
|       5 hrs | 325 | 363 |
|       7 hrs | 369 | 417 |
|   Load lbs./sq. in | 105 | 90 |
|   30' cure at 307° F.: |  |  |
|     Total Elong.: |  |  |
|       1 hr | 130 | 139 |
|       3 hrs | 212 | 219 |
|       5 hrs | 264 | 269 |
|       7 hrs | 303 | 311 |
|   Load, lbs./sq. in | 128 | 128 |
|   60' cure at 307° F.: |  |  |
|     Total Elong.: |  |  |
|       1 hr | 100 | 123 |
|       3 hrs | 181 | 194 |
|       5 hrs | 220 | 239 |
|       7 hrs | 266 | 281 |
|   Load, lbs./sq. in | 134 | 135 |
|   120' cure at 307° F.: |  |  |
|     Total Elong.: |  |  |
|       1 hr | 106 | 125 |
|       3 hrs | 145 | 167 |
|       5 hrs | 191 | 206 |
|       7 hrs | 211 | 236 |

[1] 0.5 weight percent (based on polymer) of a 36.5% solution of xylyl mercaptan in mineral oil (RPA #3).

TABLE IX

*Effect of mercaptan on GR-I carcass stock*

| | Polymer synthesized directly to government specifications | Polymer plasticized with mercaptan [1] |
|---|---|---|
| Amount of Polymer | 100.0 | 100.0 |
| Zinc Oxide | 5.0 | 5.0 |
| Stearic Acid | 3.0 | 3.0 |
| Tetramethylthirram disulfide | 1.0 | 1.0 |
| Mercaptobenzothiazole | 0.5 | 0.5 |
| Sulfur | 2.0 | 2.0 |
| Semi-reinforcing Furnace Black | 36.0 | 36.0 |
| Dibenzyl Ether | 10.0 | 10.0 |
| Mooney at 212° F. after compounding | 32 | 25 |
| Williams Plasticity—Recovery at 70° C., 5 Kg | 102–11 | 102–11 |

TENSILE—MOD. AT 300%—MOD. AT 500%—ELONGATION AT ROOM TEMPERATURE

| | | |
|---|---|---|
| Cure 15′ at 307° F | 2473-165-332-840 | 2277-123-390-850 |
| Cure 30′ at 307° F | 2447-231-523-797 | 2467-238-574-760 |
| Cure 60′ at 307° F | 2213-262-743-697 | 2360-328-743-710 |
| Cure 120′ at 307° F | 2130-328-469-693 | 2120-301-77-690 |
| Tensile—Elongation At 100° C.: | | |
| Cure 15′ at 307° F | 124-425 | 122-526 |
| Cure 30′ at 307° F | 180-360 | 127-280 |
| Cure 60′ at 307° F | 187-295 | 64-200 |
| Cure 120′ at 307° F | 190-285 | 63-200 |

TENSILE—MOD. AT 300%—MOD. AT 500%—ELONGATION, AGED 48 HRS. AT 250° F. IN AIR OVEN

| | | |
|---|---|---|
| Cure 15′ at 307° F | 1302-427-920-600 | 1222-449-959-580 |
| Cure 30′ at 307° F | 1155-418-895-600 | 1222-420-940-573 |
| Cure 60′ at 307° F | 1232-425-909-600 | 1318-454-886-620 |
| Cure 120′ at 307° F | 1460-372-783-667 | 1308-360-776-653 |
| Crescent Tear at Room Temperature: | | |
| Cure 15′ at 307° F | 168 | 208 |
| Cure 30′ at 307° F | 125 | 143 |
| Cure 60′ at 307° F | 86 | 104 |
| Cure 120′ at 307° F | 78 | 96 |
| Crescent Tear at 100° C.: | | |
| Cure 15′ at 307° F | 15 | 38 |
| Cure 30′ at 307° F | 50 | 15 |
| Cure 60′ at 307° F | | 29 |
| Cure 120′ at 307° F | | |
| Percent Rebound 40° C., Angle of fall 10°: | | |
| Cure 30′ at 307° F | 58.1 | 61.2 |
| Cure 45′ at 307° F | 60.4 | 61.2 |
| Cure 75′ at 307° F | 61.2 | 63.6 |
| Cure 135′ at 307° F | 60.4 | 60.4 |
| Percent Rebound 100° C., Angle of fall 10°: | | |
| Cure 30′ at 307° F | 77.1 | 79.7 |
| Cure 45′ at 307° F | 79.7 | 81.6 |
| Cure 75′ at 307° F | 78.9 | 82.0 |
| Cure 135′ at 307° F | 81.3 | 81.6 |

[1] 0.5 weight percent (based on polymer) of a 36.5% solution of xylyl mercaptan in mineral oil (RPA #3).

TABLE X

*Effect of mercaptan on GR-I tread stock*

| | Polymer synthesized directly to government specifications | Polymer plasticized with mercaptan [1] |
|---|---|---|
| Amount of Polymer | 100.0 | 100.0 |
| Zinc Oxide | 5.0 | 5.0 |
| Stearic Acid | 3.0 | 3.0 |
| Tetramethylthiuram disulfide | 1.0 | 1.0 |
| Mercaptobenzothiazole | .5 | .5 |
| Sulfur | 2.0 | 2.0 |
| Easy Processing Channel Black | 50.0 | 50.0 |
| Mooney at 212° F. after compounding | 74 | 82 |
| Williams Plasticity—Recovery at 70° C. 5 Kg. after compounding | 163–9 | 157–13 |

TENSILE—MOD. AT 300%—MOD. AT 500%—ELONGATION AT ROOM TEMPERATURE

| | | |
|---|---|---|
| Cure 15′ at 307° F | 2315-294-745-867 | 2597-282-758-900 |
| Cure 30′ at 307° F | 2663-384-1004-830 | 2777-456-1130-800 |
| Cure 60′ at 307° F | 2627-536-1370-730 | 2697-519-1452-730 |
| Cure 120′ at 307° F | 2660-670-1630-670 | 2757-716-1850-690 |

TENSILE—MOD. AT 300%—MOD. AT 500%—ELONGATION AT 100° C.

| | | |
|---|---|---|
| Cure 15′ at 307° F | 951-112-224-1013 | 948-170-273-1050 |
| Cure 30′ at 307° F | 1095-196-420-937 | 1028-202-492-937 |
| Cure 60′ at 307° F | 934-358-569-710 | 929-336-645-640 |
| Cure 120′ at 307° F | 1077-481-692-595 | 930-492-797-603 |

TABLE X—Continued

|  | Polymer synthesized directly to government specifications | Polymer plasticized with mercaptan [1] |
|---|---|---|
| TENSILE—MOD. AT 300%—MOD. AT 500%—ELONGATION AGED 48 HRS. AT 250°F. IN AIR OVEN | | |
| Cure 15′ at 307° F | 2603—842—1833—650 | 2617—911—1955—640 |
| Cure 30′ at 307° F | 2430—870—1817—633 | 2513—946—1933—610 |
| Cure 60′ at 307° F | 2370—872—1758—643 | 2560—889—1915—650 |
| Cure 120′ at 307° F | 2377—870—1737—657 | 2480—840—1863—650 |
| Crescent Tear at Room Temperature: | | |
| Cure 15′ at 307° F | 393 | 439 |
| Cure 30′ at 307° F | 437 | 419 |
| Cure 60′ at 307° F | 362 | 413 |
| Cure 120′ at 307° F | 340 | 294 |
| Crescent Tear at 100° C.: | | |
| Cure 15′ at 307° F | 124 | 126 |
| Cure 30′ at 307° F | 126 | 161 |
| Cure 60′ at 307° F | 118 | 165 |
| Cure 120′ at 307° F | 126 | 142 |
| Per cent Rebound 40° C. Angle of fall 10°: | | |
| Cure 30′ at 307° F | 32.2 | 34.5 |
| Cure 45′ at 307° F | 34.5 | 34.5 |
| Cure 75′ at 307° F | 35.7 | 38.7 |
| Cure 135′ at 307° F | 38.1 | 38.7 |
| Per cent Rebound 100° C. Angle of fall 10°: | | |
| Cure 30′ at 307° F | 47.8 | 50.1 |
| Cure 45′ at 307° F | 52.9 | 55.9 |
| Cure 75′ at 307° F | 58.1 | 59.6 |
| Cure 135′ at 307° F | 55.9 | 58.1 |

[1] 0.5 weight percent (based on polymer) of a 36.5% solution of xylyl mercaptan in mineral oil (RPA #3).

From the above data it is evident that the polymer has been considerably softened by the mercaptan treatment while the cure rate has not suffered. Furthermore the tensile strength, modulus, and elongation have not been affected appreciably either at room temperature or at elevated temperature while the tensile strength, tear, processing and rebound characteristics are equal or superior to polymers normally passing government specifications.

Thus, according to the present invention the processing of GR-I type polymers having an unsaturation preferably between 0.7 and 5 mol percent (prepared by copolymerizing a major proportion of isobutylene with a minor proportion of a diolefin at a temperature between −40° C. and −165° C. by the addition of a Friedel-Crafts catalyst), can be greatly facilitated by improving the plasticity of the polymers before curing, without injury to their cured properties, the plasticization being effected by intimately mixing the polymers with aryl mercaptans. Thereby much superior milling, extruding, compounding and other fabricating operations are obtained.

This application is a continuation-in-part of our copending application Serial No. 519,848, which was filed on January 27, 1944, now abandoned. The scope and spirit of the invention illustrated by but not limited to the foregoing examples, is defined by the appended claims.

We claim:

1. A method of plasticizing a rubbery copolymer having an unsaturation of at least 0.5 mol percent and prepared by reacting isobutylene with a conjugated diolefin having 4 to 6 carbon atoms per molecule in the presence of a Friedel-Crafts catalyst at a temperature within the range of −40° C. to −160° C., said method comprising intimately mixing said copolymer at a temperature within the range of 200 to 350° F. with an effective amount ranging from 0.05 to 1.0 weight percent of plasticizer of the group consisting of monocyclic and dicyclic aryl mercaptans having 8 to 10 carbon atoms per molecule and having the mercaptan sulfur atom linked to an aromatic carbon, and zinc salts thereof.

2. A method for decreasing the toughness of copolymers having an unsaturation between 0.8 and 5 mol percent and prepared by reacting 98 to 90 parts by weight of isobutylene with 2 to 10 parts by weight of isoprene in the presence of a Friedel-Crafts catalyst at a temperature within the range of −40° C. to −160° C., comprising intimately milling said copolymer for at least two minutes at a temperature between 200 and 350° F. with 0.1 to 1.0 weight percent of plasticizer of the group consisting of monocyclic and dicyclic aryl mercaptans having 8 to 10 carbon atoms per molecule and having the mercaptan sulfur atom linked to an aromatic carbon, and zinc salts thereof.

3. The method according to claim 1 wherein the diolefin is butadiene.

4. The method according to claim 1 wherein the plasticizer is xylyl mercaptan.

5. The method of claim 1 wherein the plasticizer is beta naphthyl mercaptan dissolved in mineral oil.

6. The method of claim 2 wherein the plasticizer is alpha naphthyl mercaptan.

7. The method of claim 2 wherein the milling is carried out in an enclosed zone.

8. A composition of matter comprising a major proportion of a rubbery isobutylene-isoprene copolymer having an unsaturation between 0.5 and 5.0 mol percent and 0.05 to 1.0 percent based on said copolymer of a plasticizer of the group consisting of monocyclic and dicyclic aryl mercaptans having 8 to 10 carbon atoms per molecule and having the mercaptan sulfur atom linked to an aromatic carbon, and zinc salts thereof.

9. A composition of matter comprising a major proportion of a rubbery copolymer of 98 to 40 weight percent of isobutylene with 2 to 60 weight percent of a diolefin having 4 to 6 carbon atoms per molecule, said copolymer having an unsaturation between 0.5 and 5.0 mol percent; and as a plasticizer therefor, 0.05 to 1.0 weight percent based on said copolymer of a member of the group consisting of monocyclic and dicyclic aryl mercaptans having 8 to 10 carbon atoms per molecule and having the mercaptan sulfur atom linked to an aromatic carbon, and zinc salts thereof.

10. A composition according to claim 8 wherein the placticizer is xylyl mercaptan.

11. A composition according to claim 9 wherein the plasticizer is alpha naphthyl mercaptan.

12. A composition according to claim 9 wherein the plasticizer is beta naphthyl mercaptan.

JOSEPH P. HAWORTH.
FRANCIS P. BALDWIN.

REFERENCES CITED

The following references are of record in the file of this patent:

UNITED STATES PATENTS

| Number | Name | Date |
|---|---|---|
| 2,234,204 | Starkweather | Mar. 11, 1947 |